No. 745,658. PATENTED DEC. 1, 1903.
O. H. & F. B. PERRY.
FRUIT OR VEGETABLE CLEANER.
APPLICATION FILED AUG. 27, 1900.
NO MODEL. 2 SHEETS—SHEET 1.

WITNESSES.
Rich. A. George
Vernon W. Lee

INVENTORS.
OLIVER H. PERRY
FRANK B. PERRY.
BY
ATTORNEYS.

No. 745,658. PATENTED DEC. 1, 1903.
O. H. & F. B. PERRY.
FRUIT OR VEGETABLE CLEANER.
APPLICATION FILED AUG. 27, 1900.
NO MODEL. 2 SHEETS—SHEET 2.

WITNESSES
Rich A. George
Vernon W. Lee

INVENTORS
OLIVER H. PERRY.
FRANK B. PERRY
BY
ATTORNEYS.

No. 745,658. Patented December 1, 1903.

UNITED STATES PATENT OFFICE.

OLIVER H. PERRY AND FRANK B. PERRY, OF MANLIUS, NEW YORK.

FRUIT OR VEGETABLE CLEANER.

SPECIFICATION forming part of Letters Patent No. 745,658, dated December 1, 1903.

Application filed August 27, 1900. Serial No. 28,108. (No model.)

*To all whom it may concern:*

Be it known that we, OLIVER H. PERRY and FRANK B. PERRY, citizens of the United States of America, and residents of Manlius, Onondaga county, New York, (post-office address Manlius, New York,) have invented certain new and useful Improvements in Fruit or Vegetable Cleaners, of which the following is a specification.

Our invention relates to an improvement in a vegetable-cleaner; and it consists in the mechanism and combination of parts hereinafter pointed out and claimed.

The object of our invention is to provide a machine for the cleaning of the exterior surfaces of fruit and vegetables.

Figure 1:
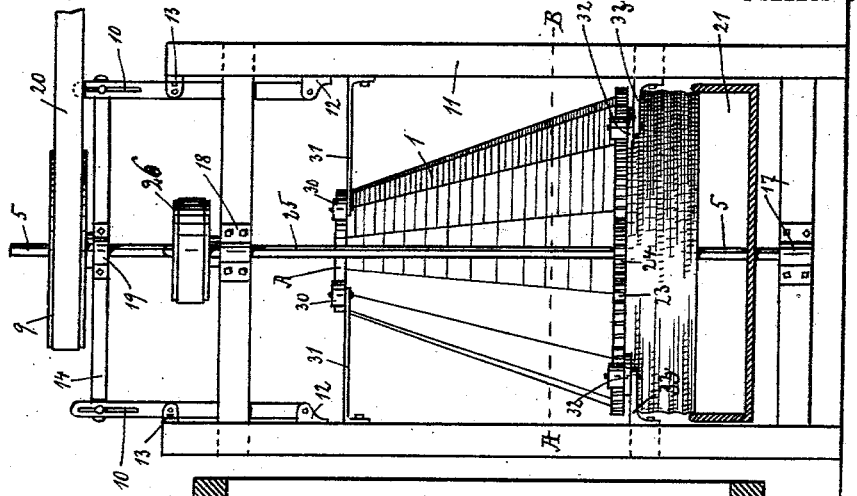
Figure 3:
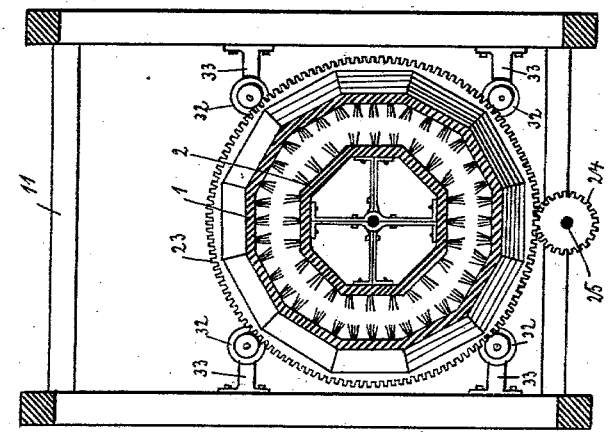
Figure 2:
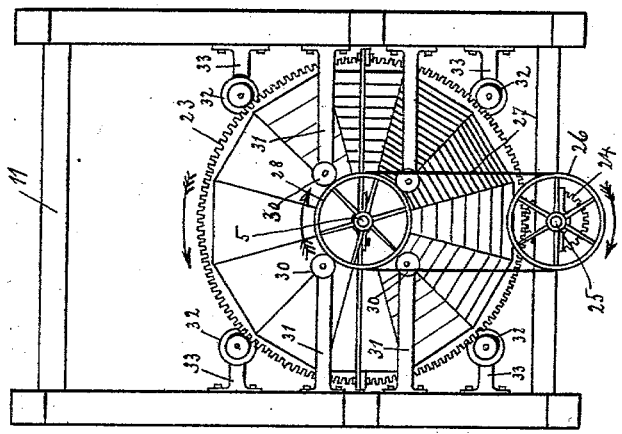
Figure 4:
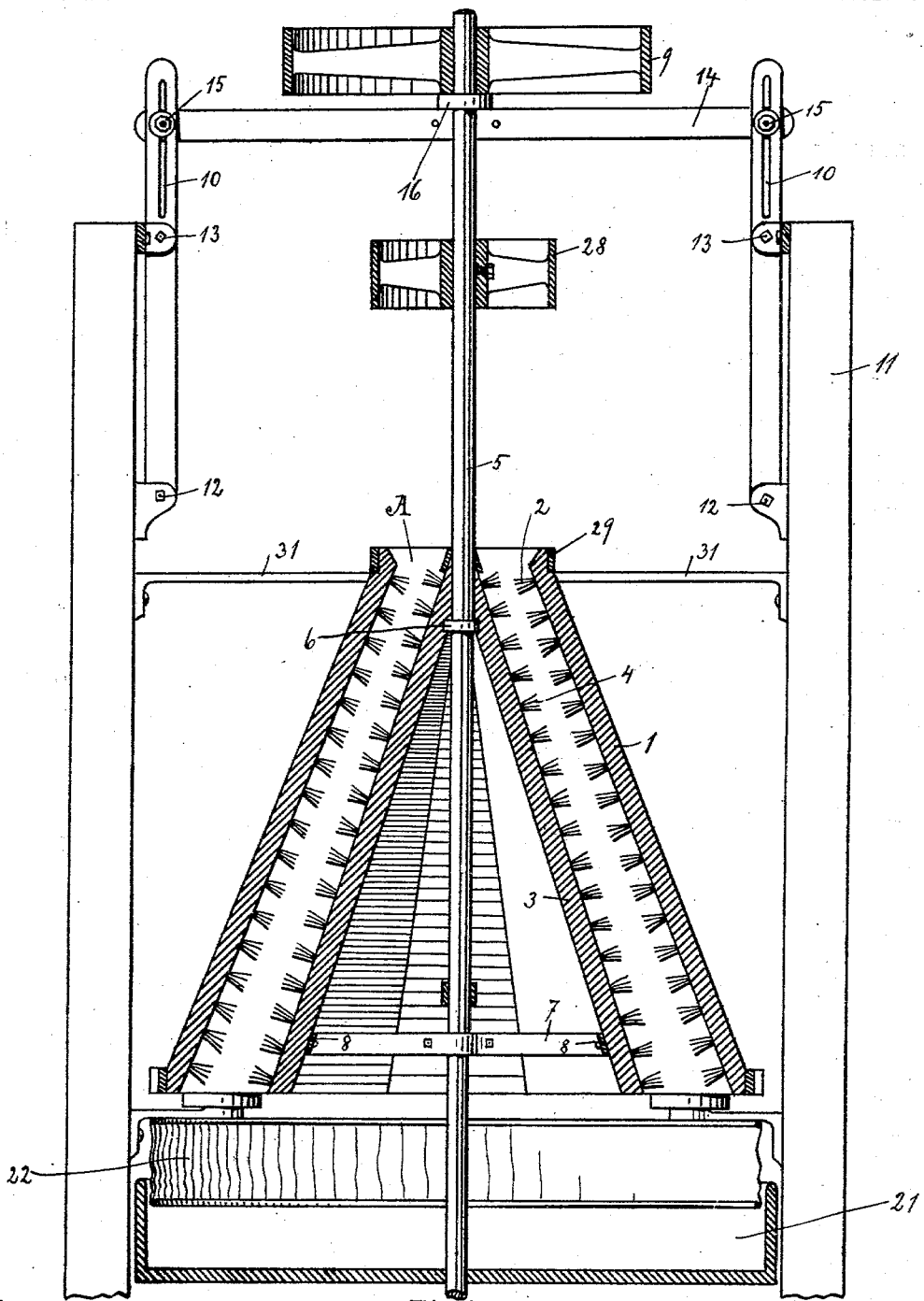

In the drawings, Figure 1 represents a front view of our machine; Fig. 2, a top or plan view. Fig. 3 is a sectional view looking downward on line A B of Fig. 1, and Fig. 4 is a vertical central section of Fig. 1 on a larger scale.

In the drawings similar numerals refer to corresponding parts in the several figures.

In cleaning the external surface of fruit and root vegetables, and especially in removing the outer skin of beets preparatory for canning, it is important that the pulp portion inside of the skin shall not be bruised or mangled. To accomplish these ends, we have embodied our best conception in a machine illustrated in the drawings, the main features of which consist in a pair of conical-shaped brushes of different diameters arranged one within the other, with the brushes arranged on the inner and outer surfaces of the two cones arranged to be rotated in opposite directions. The article to be operated on is dropped in the space between the cones, where its external surface is polished and brushed, and in the case of partially-cooked beets for canning the skin is removed preparatory to canning. The cones may be so arranged relatively to each other as to remove the skin from fruit or root vegetables.

Having described in general terms the salient features of our invention, we will now proceed to describe the same more in detail.

We provide conical shell 1 with stiff bristles or brushes 2 on the inner face of the shell. This shell is designed to be rotated, but, if desired, it may remain stationary while the inner cone or cleaning surface alone revolves, or vice versa. Inside of conical shell 1 we provide inner conical shell 3 with brushing-surface 4, the bristles of which extend outwardly. The inner conical shell is mounted on shaft 5 and is splined or otherwise keyed or held to the shaft and is supported in this instance from end movement on the shaft by collar 6. The inner cone is provided in its bottom portion with brace 7, secured at 8 to the inner wall of the inner cone, the latter being mounted to be rotated by driving-pulley 9, splined or keyed to shaft 5.

For adjusting the machine to the various sizes of articles to be operated on and to increase or diminish the friction to be applied to the article we provide means for vertically adjusting the inner cone and driving mechanism, which adjustment is accomplished in this instance by slotted brackets 10 10, supported in frame 11 by lugs 12 12, supported on the frame and steadied by supplemental lugs 13 13.

The upper portion of shaft 5 is supported and mounted to run in adjustable bracket or cross-head 14, which is made adjustable by bolts and lock-nuts 15 15, which permits the cross-head 14 to be elevated or lowered and rigidly fastened in the position in which the same may be adjusted.

On the upper face of the box which supports shaft 5 we provide collar 16, secured to the shaft which supports pulley, shaft, and cone and permits them to rotate in the position to which they may be adjusted. Shaft 5 is supported in the frame by boxes 17, 18, and 19 of Fig. 1, and the internal cone is driven by belt 20 of the same figure. By this arrangement a high rotative speed may be imparted to the inner conical-shaped brush. The articles to be operated on are delivered by hand or chute into opening A between the inner and outer conical brushes and work downward between the brushing-surfaces and are discharged at the bottom into discharge-chute 21 and thence carried to the hopper or receptacle for the article.

In Fig. 4 the distance between the brushing-surfaces is shown as greater at the outlet than at the inlet, which prevents clogging. For preventing the articles operated on from being thrown out of the chute 21, we preferably provide apron 22, which substantially surrounds and incloses the space between the bottom of the outer cone and the top of the chute 21. We, however, prefer to have both conical brushes rotate in opposite directions for increasing the efficiency of the machine. For producing this counter-rotary motion we provide, preferably, circular gear 23, rigidly secured to the lower portion of the outer conical shell 1, which gear is engaged by pinion-gear 24, mounted on shaft 25, which is provided with pulley 26, connected with belt 27 to be driven by pulley 28, splined to shaft 5, so that by driving shaft 5 in the direction of the flight of the arrow in Fig. 2 pulley 25 will be driven in the direction of the arrow in Fig. 2, and the outer conical shell 1 is driven in the direction of the flight of the arrow in Fig. 2 in an opposite direction from the movement of the inner conical-shaped brush.

For maintaining the outer cone-shell 1 in proper position to be rotated we provide a circular band 29 in Fig. 4 on the neck of the outer conical shell, and in contact with this band or track 29 we mount antifriction-rolls 30, supported in brackets 31, which maintain the outer conical shell in position to be rotated. The base of the outer conical shell we support by flanged idlers 32, mounted on brackets 33.

Changes and modifications will readily suggest themselves to those skilled in the art and may be made without departing from the spirit of our invention. For instance, by adjustment of the driving power through the use of ordinary gears the relative speed of the two brushes may be increased or decreased.

What we claim as new, and desire to secure by Letters Patent, is—

1. In a vegetable-cleaner, a frame, two concentric brush-surfaces arranged to present a downwardly-divergent space between the operative surfaces thereof, a central power-shaft, means operative from said shaft for revolving the brushing-surfaces in opposite directions the inner surface being secured to the shaft, means for vertically adjusting said inner brushing-surface, a rolling support for the outer brushing-surface, a chute beneath the space between the brushing-surfaces, and an apron arranged to close the space between the mouth of the outer brushing-surface and the mouth of the chute, whereby to deflect material from the brushing-surfaces into the chute.

2. In a vegetable-cleaner, a frame, two concentric brush-surfaces arranged to present a downwardly-divergent space between the operative surfaces thereof, a central power-shaft secured to the inner brushing-surfaces, slotted brackets fixed in the frame, a crosshead supporting the power-shaft and having a sliding connection with the brackets, means operative from the power-shaft for revolving the outer brushing-surface, a rolling support for the outer brushing-surface, a chute beneath the space between the brushing-surfaces, and an apron arranged to close the space between the mouth of the outer brushing-surface and the mouth of the chute, whereby to deflect material from the brushing-surfaces into the chute.

Signed by us this 31st day of July, 1900.
OLIVER H. PERRY.
FRANK B. PERRY.

Witnesses:
JOHN MYRER,
F. J. WAINWRIGHT.